United States Patent Office 3,153,073
Patented Oct. 13, 1964

3,153,073
CYCLOHEXADIENYL MANGANESE
TRICARBONYLS
Geoffrey Wilkinson, London, England, assignor to
Ethyl Corporation, New York, N.Y., a corporation
of Virginia
No Drawing. Filed July 21, 1961, Ser. No. 125,684
Claims priority, application Great Britain Aug. 8, 1960
18 Claims. (Cl. 260—429)

This invention relates to and has as its object the provision of new organometallic compounds and methods for their preparation.

I have recently prepared new compounds having the formula CyhM(CO). In this formula Cyh represents a cyclohexadienyl group and M represents a Group VIIB metal atom, i.e., manganese, technetium and rhenium. The cyclohexadienyl moiety, Cy, may be substituted or unsubstituted. When substituted, it can contain various substituent groups such as hydrogen; deuterium; an alkyl group such as methyl, ethyl, propyl, butyl, or the like; an aryl group such as phenyl, tolyl and the like; substituted alkyl or aryl groups such as dichloromethyl, monochloromethyl, dibromopropyl, difluoroamyl, and the like, or various other substituent groups such as dimethyl arsine, diphenylstibine, dimethylphosphine, and the like.

A preferred form of my invention is the compound cyclohexadienyl manganese tricarbonyl. This compound is easily prepared and is quite stable. Because of its stability, it has great utility as an antiknock when present in a hydrocarbon fuel which is used in an internal combustion engine.

Other examples of preferred compounds include methylcyclohexadienyl manganese tricarbonyl, 1,3,5-trimethylcyclohexadienyl manganese tricarbonyl, hexamethylcyclohexadienyl manganese tricarbonyl and benzocyclohexadienyl manganese tricarbonyl. In general, preferred compounds are those having the formula CyhMn(CO)$_3$ where Cyh represents a cyclohexadienyl hydrocarbon radical of 6 to 12 carbon atoms.

My invention also includes two methods for preparing the new compounds. In the first method, they are prepared by reacting the appropriate cyclohexadiene compound with a Group VIIB metal carbonyl compound. In this reaction, carbonyl groups are displaced by the cyclohexadienyl moiety to yield cyclohexadienyl-Group VIIB metal-carbonyl compounds. This reaction may be performed under moderate temperature and pressure conditions. Also, there can be present in the reaction mixture an inert solvent which may be, for example, an aliphatic hydrocarbon such as hexane, heptane or octane, or a polar ether solvent such as tetrahydrofuran, ethylene glycol dimethyl ether, diethylene glycol dimethyl ether, dioxane and the like.

In a second general method I prepare my new compounds by reduction of the corresponding arene manganese tricarbonyl cations, ArMn(CO)$_3$$^+$, where Ar is an aromatic hydrocarbon molecule corresponding to the desired cyclohexadienyl radical. This second method is preferred because of higher yields and milder conditions. These cations are described in the paper by Coffield et al., Journal of the American Chemical Society, 79, 5826 (1957). Typically they are isolated as the iodides, perchlorates, bromides, mercuric chlorides, and the like. Reduction of such cations with reducing agents provides a general method for preparation for my compounds. The reduction can be accomplished either in aqueous medium, as with sodium borohydride or more conveniently in anhydrous ether suspension by lithium aluminum hydride. In the latter case, the perchlorate salt of the arene manganese tricarbonyl gives especially good results. The reduction is accomplished under very mild conditions; frequently taking place even at room temperature. Numerous other reducing agents, whose nature will be apparent to those skilled in the art, can also be used.

To further illustrate my processes and the novel compounds obtained thereby, there is presented the following examples:

Example 1

Manganese pentacarbonyl and cyclohexa-1,3-diene were heated for 36 hours at 160° C. in the presence of an inert solvent. The reaction mixture was then heated in vacuo to remove the solvent and the residue was subjected to vacuum sublimation and crystallization to yield an air stable pale yellow solid having a plate-like crystalline form. The solid product had a melting point of 78° C. with a strong camphroaceous odor. On analysis the compound was found to be cyclohexadienyl manganese tricarbonyl. Found: C, 49.7; H, 3.7; O, 21.4 percent with a molecular weight of 218. C$_6$H$_7$Mn(CO)$_3$ requires: C, 49.6; H, 3.2; O, 22.0 percent with a molecular weight of 218.

The structure of the compound was further confirmed by means of its infrared spectrum which showed strong carbonyl bands at 2030 and 1937 cm.$^{-1}$ and C–H stretching bands at 3050, 2960 and 2800 cm.$^{-1}$. The structure of the compound was further verified by means of its nuclear magnetic resonance spectrum.

Example 2

Similar results were obtained by heating 3.9 parts of manganese pentacarbonyl and 40 parts of cyclohexa-1,3-diene in mesitylene solvent at 145° C. for 12 hours. The yield of product in this instance was 2 percent.

Example 3

To an aqueous solution of benzene manganese tricarbonyl chloride was added, in portions, sodium borohydride. The solution was extracted six times with n-pentane as rapidly as possible and after drying over sodium sulfate the majority of the pentane was removed from the yellow pentane solution by vacuum distillation. The residue was then transferred to an alumina column which was eluted with a pentane-ether mixture. The first yellow band, after removal of solvent and sublimation of the residue, gave cyclohexadienyl manganese tricarbonyl in over-all yield of 18 percent based on the manganese pentcarbonyl chloride used to prepare the arene manganese tricarbonyl cation.

Example 4

To a suspension of anhydrous C$_6$H$_6$Mn(CO)$_3$ClO$_4$ (2.1 part) in ether was added LiAlH$_4$ (1 part) in small portions. The solution gradually turned yellow and after 15 minutes excess water was carefully added in portions. More ether was added and the layers separated. The ether layer was dried (Na$_2$SO$_4$) and reduced after which the product was chromatographed as in Example 3 [1st band, 0.55 part (41 percent based on perchlorate); 2nd band, 0.012 part]. This method was also utilized to prepare the deuteride C$_6$H$_6$DMn(CO)$_3$ using LiAlD$_4$.

Example 5

To the aqueous solution as in Example 3 were added magnesium turnings and concentrated hydrochloric acid. The red-brown solution was extracted four times with ether and the products isolated as before (1st band, 0.060 part (2 percent)); the 2nd band was poorly defined.

Various substituted cyclohexadienyl manganese tricarbonyls were prepared from the corresponding arene manganese tricarbonyl cations by the procedure of Example 3. The solid derivatives were isolated as in Example 3; the liquid products were molecularly distilled to a dry ice-cooled probe.

In this manner, the following products were prepared: From toluene manganese tricarbonyl cation, methylcyclohexadienyl manganese tricarbonyl. This unsymmetrical product exists as two isomers. The first is a yellow oil containing 51.6 percent carbon, 3.8 percent hydrogen and 25.8 percent manganese. The second isomer is a yellow-orange oil found to contain 52.0 percent carbon and 4.1 percent hydrogen. The theoretical values are C, 51.7; H, 3.9; Mn, 23.2. From mesitylene manganese tricarbonyl cation, 1,3,5-trimethylcyclohexadienyl manganese tricarbonyl as an orange oil containing 56.1 percent carbon and 5.8 percent hydrogen. Theoretical values are C, 55.4; H, 5.0. From hexamethylbenzene manganese tricarbonyl cation, hexamethylcyclohexadienyl manganese tricarbonyl as an orange solid melting at 70° C. This product had 60.6 percent carbon and 7.1 percent hydrogen. The theoretical values are 59.6 percent carbon and 6.3 percent hydrogen. From naphthalene manganese tricarbonyl cation, benzocyclohexadienyl manganese tricarbonyl as an orange product melting around 10° C. This product contained 56.9 percent carbon and 5.0 percent hydrogen. The theoretical values are 58.2 percent carbon and 3.4 percent hydrogen.

It appears that the cyclohexadienyl radicals in my new compounds act as 5 electron donors and are thus analogous to cyclopentadienyl radicals in their bonding. They are therefore quite different from cyclohexadiene derivatives of iron and molybdenum. This belief is supported by the fact that the compound cyclohexadienyl manganese tricarbonyl is similar chemically to the analogous cyclopentadiene compounds. Thus, cyclohexadienyl manganese tricarbonyl reacts with carbon tetrachloride to form chloroform and a manganese containing organometallic compound which exists as red, needle-like crystals. Likewise, cyclohexadienyl manganese tricarbonyl reacts with acids to yield a cationic manganese containing organometallic species.

The chemical properties of the various cyclohexadienyl compounds are very similar. They are either yellow or orange crystalline solids or oils readily sublimable in vacuum which are readily soluble in common organic solvents but are insoluble in and unaffected by water; they have strong camphoraceous odors. In air they are reasonably stable but their solutions in benzene or hydrocarbons decompose extensively within an hour or two in air giving brown paramagnetic material.

As stated previously, the compounds of my invention find utility as gasoline additives. Their function in the gasoline is to enhance its antiknock properties particularly by enhancing the antiknock activity of other antiknock compounds such as tetraethyllead which are co-present in the gasoline. Also, however, my compounds may be utilized as a primary antiknock in gasoline in which case they are the sole antiknock component. When employed as additives to gasoline, there may also be present in the fuel alkylene halide scavengers such as ethylene dichloride and ethylene dibromide, or phosphorus-containing scavengers such as tricresylphosphate, phenyl dimethyl phosphate, trimethyl phosphate, and the like.

Another use for my novel compounds is as additives to residual and distillate fuels such as home heater fuels, jet fuels, diesel fuels, and the like. When so used, my compounds greatly reduce the tendency of the fuel to form smoke or soot on combustion.

A further application for my novel compounds is in metal plating. When so employed, the compound is decomposed in a chamber, which is preferably evacuated, that contains the article to be plated. On decomposition of my organometallic compound, e.g., cyclohexadienyl manganese tricarbonyl, a uniform coating of manganese is formed on the article to be plated. Such coatings may be employed for decorative purposes, to protect the surface of the article from corrosion, and, in some cases, to form an electrically conductive surface on the article. In the latter case, my compounds may be utilized in forming printed circuits.

I claim:
1. As a composition of matter a compound having the formula $CyhM(CO)_3$ wherein Cyh is a cyclohexadienyl hydrocarbon radical having 6 to 12 carbon atoms and is selected from the class consisting of the cyclohexadienyl radical and substituted cyclohexadienyl radicals wherein the substituents are selected from the class consisting of alkyl, aryl and benzo groups and M is a metal of Group VIIB of the Periodic Table.
2. Cyclohexadienyl manganese tricarbonyl.
3. A compound of claim 1 wherein the cyclohexadienyl hydrocarbon radical is an alkyl substituted cyclohexadienyl radical.
4. Methylcyclohexadienyl manganese tricarbonyl.
5. 1,3,5 - trimethylcyclohexadienyl manganese tricarbonyl.
6. Hexamethylcyclohexadienyl manganese tricarbonyl.
7. Benzocyclohexadienyl manganese tricarbonyl.
8. Monodeuterocyclohexadienyl manganese tricarbonyl.
9. Process for the preparation of cyclohexadienyl manganese tricarbonyl, said process comprising reacting benzene manganese tricarbonyl chloride with sodium borohydride.
10. Process for the preparation of cyclohexadienyl manganese tricarbonyl, said process comprising reacting benzene manganese tricarbonyl perchlorate with lithium aluminum hydride.
11. Process for the preparation of monodeuterocyclohexadienyl manganese tricarbonyl, said process comprising reacting benzene manganese tricarbonyl perchlorate with lithium aluminum deuteride.
12. A process for the preparation of a cyclohexadienyl Group VIIB metal tricarbonyl having the formula

$$CyhMn(CO)_3$$

wherein Cyh is a cyclohexadienyl hydrocarbon radical having from 6 to 12 carbon atoms and is selected from the class consisting of the cyclohexadienyl radical and substituted cyclohexadienyl radicals wherein the substituents are selected from the class consisting of alkyl, aryl and benzo groups; said process comprising reacting the corresponding arene Group VIIB metal tricarbonyl salt wherein the anion portion thereof is selected from the class consisting of halide and perchlorate, with a reducing agent selected from the class consisting of sodium borohydride, lithium aluminum hydride, lithium aluminum deuteride, and magnesium turnings with concentrated hydrochloric acid, whereby one atom of hydrogen enters into the arene molecule to form the cyclohexadienyl radical and the manganese atom is reduced to an uncharged electrovalent state.
13. The process of claim 12 wherein the anion of said arene manganese tricarbonyl salt is perchlorate.
14. The process of claim 13 wherein lithium aluminum hydride is the reducing agent.
15. The process of claim 14 wherein the solvent is anhydrous ether.
16. The process of claim 12 carried out in the presence of an inert organic solvent.
17. The process of claim 12 wherein sodium borohydride is the reducing agent.
18. The process of claim 17 carried out in the presence of water.

References Cited in the file of this patent
UNITED STATES PATENTS

| | | |
|---|---|---|
| 2,818,416 | Brown et al. | Dec. 31, 1957 |
| 2,870,180 | Kozikowski | Jan. 20, 1959 |
| 3,015,668 | Kozikowski | Jan. 2, 1962 |

FOREIGN PATENTS

| | | |
|---|---|---|
| 1,214,952 | France | Nov. 16, 1959 |

OTHER REFERENCES
Hallam et al.: "J. Chem. Soc. (London)," February 1958, pages 642–645.